United States Patent [19]

Goudy, Jr. et al.

[11] Patent Number: 4,597,530
[45] Date of Patent: Jul. 1, 1986

[54] FLUID DIFFUSER

[75] Inventors: Paul R. Goudy, Jr., Shorewood; William P. Doolittle, Slinger; Thomas E. Jenkins, Glendale; Bernard J. Beemster, Mequon; William N. Roos, Colgate; Patrick V. Collins, Brown Deer, all of Wis.

[73] Assignee: Autotrol Corporation, Milwaukee, Wis.

[21] Appl. No.: 655,890

[22] Filed: Sep. 28, 1984

[51] Int. Cl.⁴ ................................................. B05B 1/32
[52] U.S. Cl. .................................. 239/452; 239/533.13
[58] Field of Search ................. 239/452, 451, 533.1, 239/533.13, 533.14; 261/122

[56] References Cited

U.S. PATENT DOCUMENTS

| | | | |
|---|---|---|---|
| 3,334,819 | 8/1967 | Olavson | 239/533.13 |
| 3,525,436 | 8/1970 | Reckers | 210/220 |
| 3,997,634 | 12/1976 | Downs | 261/122 |

OTHER PUBLICATIONS

PCI Hydro-Chek Air Diffusers "Simple and Cost Effective", Chicago Pump Bulletin 7823.
Chicago Pump Bulletin 7822-A.

Primary Examiner—Andres Kashnikow
Assistant Examiner—Scott D. Malpede
Attorney, Agent, or Firm—Quarles & Brady

[57] ABSTRACT

A diffuser for air or other fluids has a rigid body with a flat disc and a hollow boss defining a central opening. The perimeter of the disc is scalloped and is defined by alternating curved crests and valleys. A flexible elastomeric diaphragm overlays the top of the disc and has a rim portion with spaced recesses that receive the crests of the perimeter of the disc. The rim portion does not extend to the bottom of the valleys of the perimeter and as a result, air openings are defined between the rim portion and the bottoms of the valleys. Air under pressure admitted to the central opening will deform the diaphragm and allow air to escape through the air openings. A series of vanes may be formed on the underside of the disc radiating from the boss. The vanes, together with vane extensions formed on the underside of the diaphragm rim portion, define a compartment for each air opening so that bubbles released from one air opening do not mix or combine with bubbles from adjacent air openings. The vanes and vane extensions may be formed on a spiral to give a spiral flow to the bubbles.

12 Claims, 10 Drawing Figures

FLUID DIFFUSER

BACKGROUND OF THE INVENTION

This invention relates to fluid diffusers, and particularly to an improved diffuser that is useful for introducing bubbles of air into wastewater to be treated.

In the aeration treatment of wastewater, it is common to introduce the air through a series of submerged diffusers mounted at spaced positions along the length of a manifold pipe. The diffusers have apertures through which the air can escape, preferably as small bubbles. A common type of diffuser uses a rubber or rubber-like flexible diaphragm working against a flat, rigid disc. When air is not being admitted to the diffuser, the flexible diaphragm seats against the hard disc under the pressure of the water and seals the air openings. When air is admitted under pressure, the flexible diaphragm moves away from the disc and opens the apertures to allow the air to escape.

One form of flexible diaphragm diffuser is disclosed in U.S. Pat. No. 3,525,436 issued Aug. 25, 1970 to D. J. Reckers for "Sewage Treatment Plant." In the diffuser of that patent, the rigid disc has a series of holes located inwardly of its perimeter. The flexible diaphragm overlays the top surface of the disc and is joined to the perimeter of the disc by a clamp. When air is introduced under pressure through a central opening in the disc, the diaphragm is unseated and air can pass out the bottom through the holes in the disc. Another form of diaphragm diffuser traps the diaphragm between the top surface of the disc and an upper retaining ring. When air under pressure is admitted through a central disc opening, the diaphragm moves off of the top of the disc and air can escape radially outwardly between the disc and the diaphragm.

Still another form of diaphragm diffuser uses no clamp or retainer ring but instead relies upon the resiliency of the diaphragm to hold it to the rigid disc. In this version, the rigid disc has a scalloped perimeter which is grasped by a rim of the diaphragm. Holes are provided in the diaphragm and the holes are closed until the diaphragm is moved away from the disc when air is admittted through a central opening in the disc.

One problem encountered by all such air diffusers is the potential build-up of deposits in the air openings, particularly when hard water is treated. The resulting calcium deposits can partially close the air passages if the operation of the diffuser does not tend to cause the calcium deposits to be physically broken up or if the direction of air travel through the openings is such that not all surfaces of the openings are scoured by the passing air. Also, in those diaphragm diffusers which do not provide a separate retainer or clamp for joining the diaphragm to the rigid disc, the diaphragm can be blown loose of the disc. This danger increases after the air passages have become partly clogged because of the resulting increase in the air pressure against the diaphragm.

A diffuser in accordance with the present invention provides a simple but efficient mechanism for introducing air or other fluid into a liquid or other fluid. Discrete air openings are defined between the perimeter of the disc and a perimeter of the diaphragm, so that the flexing of the diaphragm will help to dislodge calcium deposits and a desirable direction of air travel through the passages will scour the entire passage. The diffuser is also self-regulating in that increased air pressure will tend to decrease the size of the air openings. At the same time, the diffuser exhibits improved anchoring of the diaphragm to the disc without the need for a separate clamp or retainer.

SUMMARY OF THE INVENTION

In accordance with the invention there is provided a diffuser that includes a rigid disc having a central opening and a scalloped perimeter defined by alternating crests and valleys, together with a flexible diaphragm that has a flat uninterrupted portion overlaying a face of the disc and a rim portion that receives only the crests to thereby define passages between the rim portion and the valleys, which passages are opened when air or other fluid is admitted under pressure through the central passage.

The diaphragm is preferably formed of an elastomer that will deform under the influence of air or other fluid admitted under pressure through the central opening so that the rim portion will move into the valleys.

The diffuser of the invention is preferably formed with scalloped edges that are defined by curved surfaces and the rim portion of the diaphragm has recesses which receive the crests while leaving the valleys free. The central opening is formed in a hollow boss that is integral with the disc and which may be provided with standard pipe threads.

In one embodiment, circumferential shoulder sections extend between the crests and the valleys and the rim portion abuts against the shoulder sections. In another embodiment, the shoulder sections slope radially and the rim portion rides over the shoulder sections under the influence of fluid under pressure admitted through the central opening.

Further in accordance with the invention, the disc with its integral boss may be provided with vanes that extend outwardly from the boss towards the shoulder to define a compartment at each air passage that assists in preventing bubbles released from adjacent passages from joining together into large bubbles. The vanes may be extended along the rim portion of the diaphragm. Also, the rim portion may be provided with notches between the recesses to direct the flow of the air bubbles and thereby keep the bubbles well dispersed.

It is a principal object of the invention to provide an efficient fluid diffuser, particularly useful for the introduction of air in wastewater treatment, which is comprised of but two parts held together by their own force.

It is also an object of the invention to provide a diffuser whose fluid passages are self regulating.

It is another object of the invention to provide such a diffuser in which the fluid openings are so shaped, structured and located as to minimize the possible build-up of deposits such as calcium.

The foregoing and other objects and advantages of the invention will appear in the following detailed description. In the description reference is made to the drawings which illustrate preferred embodiments of the invention.

DETAILED DESCRIPTION OF THE PREFERRED EMBODIMENTS

Figure 1:
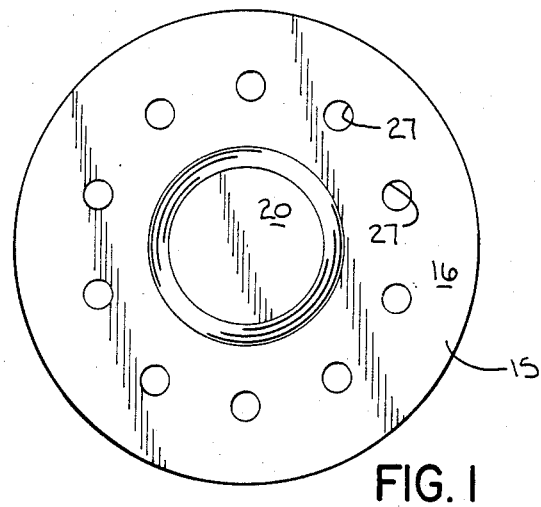
FIG. 1 is a top plan view of a diffuser of the prior art.
Figure 2:
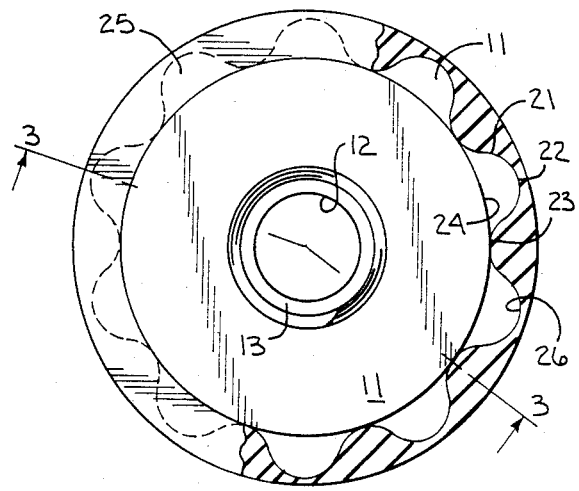
FIG. 2 is a bottom view of the diffuser of FIG. 1 with portions broken away for purposes of illustration.
Figure 3:
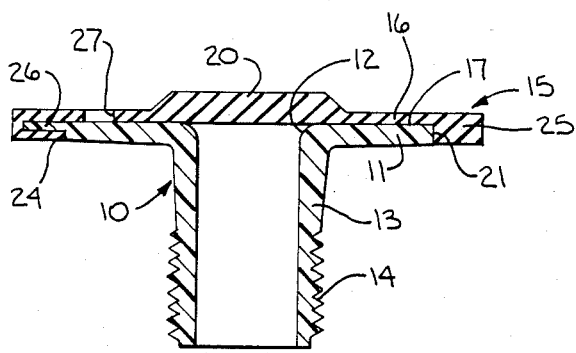
FIG. 3 is a view in vertical section taken in the plane of the line 3—3 of FIG. 2.

FIGS. 1–3 illustrate a prior art air diffuser. The prior art diffuser has a rigid body 10 that includes a flat disc 11 with a central opening 12 and an integral, hollow boss 13 that is an extension of the central opening 12, and which has standard external pipe threads 14. A flexible rubber diaphragm 15 has a flat upper portion 16 that overlays the top face 17 of the disc 11. The flat portion 16 of the diaphragm has a built-up center portion 20 that will act like a check valve to close off the central opening 12 under the pressure of water above the diffuser. The diaphragm 15 is formed of rubber or other elastomer and has a durometer hardness of 75 to 90 D.

The outer perimeter 21 of the disc 11 has a scalloped edge defined by alternating crests 22 and valleys 23, both of which are formed by gently curved surfaces. A circumferential shoulder 24 is inscribed at the valleys 23 of the scalloped perimeter 21. The diaphragm 15 has a thick rim portion 25 having a series of radial recesses 26 that receive and complement the crests 22 of the scalloped perimeter 21 of the disc 11. The rim portion 25 abuts against the shoulder 24. The diaphragm 15 has a series of circular holes 27 which are arrayed in a circle and which extend through the flat portion 16 of the diaphragm 15.

The prior art diffuser of FIGS. 1–3 is assembled simply by stretching the rim portion 25 of the diaphragm 15 over the crests 22 or the scalloped perimeter and then allowing the diaphragm to snap into place. The resiliency of the diaphragm 15 will tend to hold it in place on the scalloped perimeter. When air is admitted under pressure through the central opening 12, the diaphragm 15 will lift off of the top face 17 of the disc 11 and air will escape through the now open holes 27.

In this prior art diffuser, there is an observable tendency for that half of each hole 27 that is radially inward to become caked or coated with a deposit from the water, usually a compound of calcium. It is suspected that the reason for that occurrence is that the air exiting from the central opening 12 and moving radially outwardly between the top face 17 of the disc 11 and the underside of the diaphragm 15 will strike only the outermost half of the holes 27. Even though the diaphragm 15 flexes as the air supply is turned on and off, there does not seem to be enough flexing to cause a break up of the deposits in the holes 27. As a result, the effective area of the holes 27 is reduced considerably.

It has also been observed that the diaphragm 15 will tend to become unseated from the scalloped perimeter under operating air pressures, and may be blown off of the body 10. It is believed that this results from the distortions in the diaphragm that are caused by the stresses applied as the diaphragm is flexed under air pressure. Specifically, as the diaphragm tends to balloon outwardly, the rim portion which is thickest between each crest 22 will be drawn tightly against the shoulder 24 of the disc. This will cause puckering of the flexible diaphragm and will cause these sections of the rim portion 25 at the recesses 26 to move away from the under surface of the crests 22. This is the start of an unrolling or unseating action which then appears to be amplified in its effect as air begins to escape past the recesses 26. To minimize this phenomenon the prior art uses a relatively hard material to reduce the amount of distortion.

Referring to FIGS. 4–7, the improved diffuser of this invention also employs a rigid body 30 having a disc 31 from the bottom face 32 of which extends an integral, hollow boss 33 provided with standard pipe threads 34 and which leads to a central opening 35. The perimeter 36 of the disc 31 also has a scalloped shape formed by alternating crests 37 and valleys 38. Circumferential shoulder sections 39 are formed on the bottom face 32 of the disc 31 at a diameter which is between that of the tops of the crests 37 and the bottoms of the valleys 38.

A diaphragm 40 has a flat, uninterrupted upper portion 41 that overlays the top face 42 of the disc 31. The diaphragm 40 also has a built up center section 43 that acts as a check valve against the central opening 35. A thick rim portion 44 of the diaphragm 40 has recesses 45 to receive only a portion of each crest 37. A radially inwardly facing inner edge 46 of the rim portion 44 confronts the shoulder sections 39 and is spaced from the bottoms of the valleys 38. The resulting air openings 47 are defined between the valleys 38 and the inner edge 46 of the rim portion 44.

It will be appreciated that when air under pressure is admitted into the central opening 35, the flat upper portion 41 of the diaphragm 40 will tend to lift off of the top face 42 of the disc 31 and air can then escape radially between the disc and diaphragm and out of the openings 47 at the perimeter of the disc 31. The air exits beneath the diffuser and must travel radially outwardly before it can escape. This aids in the dispersion of the air bubbles.

The diffuser of the present invention is self regulating because the size of the air openings 47 will be reduced as the air pressure increases. As the air pressure increases, the edge 46 of the rim portion 44 first abuts the shoulder sections 39 and then is deformed further into the valleys 38 toward the bottoms of the valleys 38. Both actions tend to reduce the size of the openings 47. This is directly contrary to the operation of the prior art device of FIGS. 1–3 in which the air openings 27 will increase in size under increased air pressure.

The diffuser of the preferred embodiment exhibits an improved capability to hold the diaphragm onto the disc even under extremes of air pressure. The load on the diaphragm of the present invention is carried at the tops of the crests rather than at the abut of the shoulder and rim portion as in the prior art. Since the thickest section of the rim portion 44 does not abut against a shoulder, the diaphragm 40 is allowed to be drawn inwardly as its center is ballooned outwardly under air pressure and there is no puckering of the rim portion at the area of the recesses 45. As a result, there is no tendency for air to escape except through the openings 47 and no tendency for the diaphragm to unseat itself from the perimeter of the disc. The improved holding capability allows the use of softer material for the diaphragm. In the preferred form, the diaphragm 40 is formed of a neoprene or Buna N rubber, or other elastomer, and it may have a wide range of hardness. Satisfactory operation has been achieved with an elastomer having a durometer hardness of about 50 D and softer material may also be used. The soft material enhances the deformability and improves the self regulating operation.

The air openings 47, formed as they are between the perimeter of the disc and a peripheral edge of the diaphragm, exhibit little or no accumulation of deposits over any of their surfaces. It is believed that this results from the escaping air first tending to strike the edge 46 of the rim portion 44 and then bouncing off that edge past the curved edge of the valley 38 with the scouring action tending to keep the curved edge clean of deposits. That air path is illustrated by arrows in FIG. 7. The face 46 of the rim portion 44 also appears to be constantly agitated, or fluttered, by the striking of the air and by the significant flexing of the diaphragm 40 which occurs at that point so that any foreign materials which might tend to collect or deposit themselves on this surface of the rim portion are continuously broken away. The fluttering appears to increase as the edge 46 is increasingly deformed into the valleys 38. As a result, the openings 47 when in use exhibit little or no accumulation of deposits over any of their surfaces.

Figure 8:
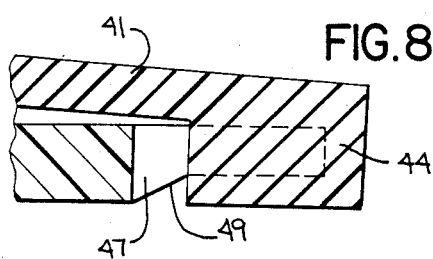
FIG. 8 is a view similar to FIG. 7 but illustrates a modified form of circumferential shoulder.

The diffuser need not use abrupt shoulder sections 39. Instead, as shown in FIG. 8, the shoulder sections 49 may slope gradually in a radial direction and the rim portion 44 of the diaphragm 40 can ride along the slope as the diaphragm is deformed. The diffuser will also function without any shoulder sections.

Figure 9:
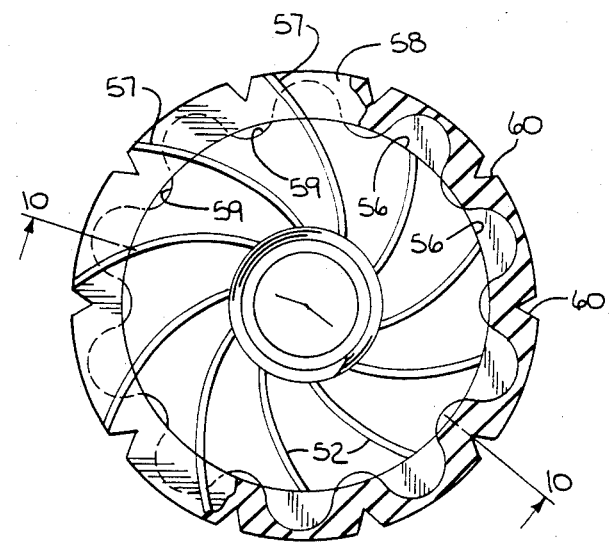
FIG. 9 is a view similar to FIG. 5 but illustrating an alternative embodiment of the invention.
Figure 10:
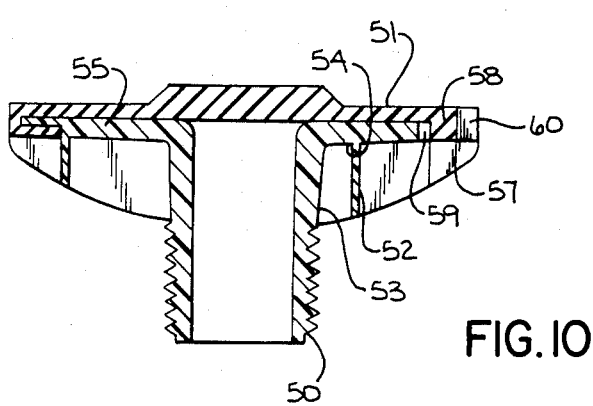
FIG. 10 is a view in vertical section of the alternative embodiment taken in the plane of the line 10—10 of FIG. 9.
Figure 4:
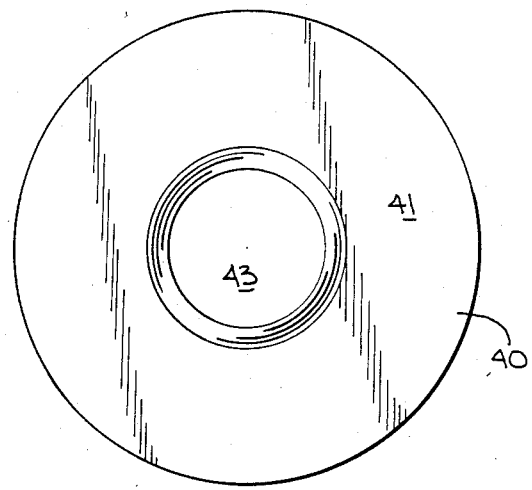
FIG. 4 is a top plan view of the diffuser in accordance with the present invention.
Figure 5:
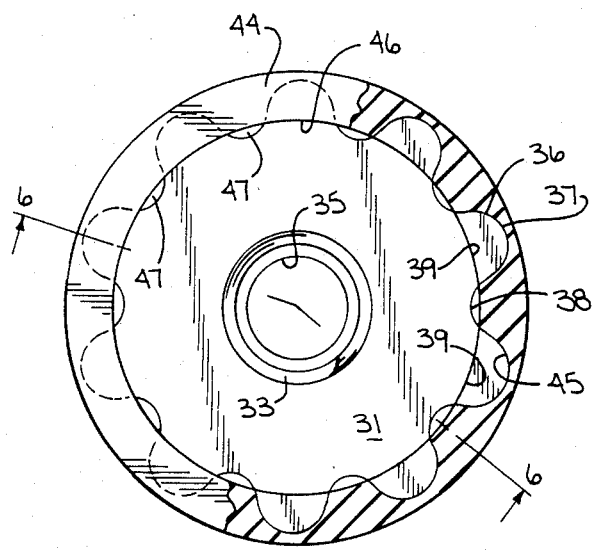
FIG. 5 is a bottom view of the diffuser of FIG. 4 with portions broken away for purposes of illustration.
Figure 6:
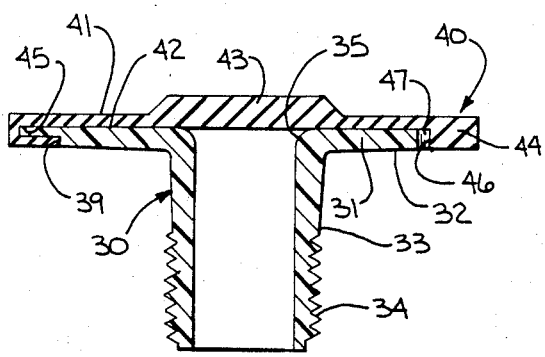
FIG. 6 is a view in vertical section taken in the plane of the line 6—6 of FIG. 5.
Figure 7:
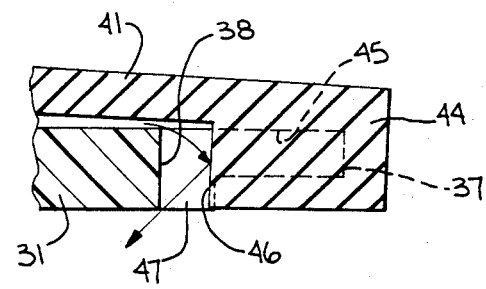
FIG. 7 is a partial view in section to an enlarged scale illustrating the opening of the air passages in the diffuser of FIGS. 4–6.

In the embodiment of FIGS. 9 and 10, the body portion 50 and diaphragm 51 are identical to their counterparts in the first embodiment with only two exceptions. First, a series of spiral vanes 52 are formed integral in the body portion 50. The vanes 52 each extend from the center boss 53 along the bottom face 54 of the disc portion 55 and terminate at a shoulder section 56 at about the center of each crest. A like series of vane extensions 57 are formed along the underside of the rim portion 58 and act as continuations of the vanes 52. The series of vanes 52 and vane extensions 57 define compartments therebetween, each of which contains a single opening 59 for the escape of air. The bubbles which escape through the openings 59 will be separated by the vanes 52 and extension 57 from bubbles escaping from an adjacent opening and the bubbles will not be allowed to agglomerate or combine therewith. The result is that a pattern of smaller bubbles will be discharged from the diffuser and bubble out from beneath the diffuser. The second difference is that the rim portion 58 of the diaphragm 51 is provided with a series of notches 60 each located in an area between a recess. These notches 60 tend to direct the bubbles within each compartment to exit in a stream at the perimeter of the disc. The vanes 52 and vane extensions 57 are shown as spiraling outwardly from the boss 53 so that a spirally or twisting action is given to the flow of bubbles. The notches 60 may also be aligned at an angle across the face of rim portion to act as a further extension or continuation of the spiral path. The vanes and vane extensions may also extend radially outwardly from the boss 53 for simplicity of tooling and molding.

The preferred embodiments use gently curved surfaces to define the crests and valleys. Sharply curved surfaces could also be used as could straight line surfaces with curved corners. The gently curved surfaces result in less distortion to the diaphragm and ease of keeping the surfaces free of deposits.

The diffuser has been described in relation to its use as an aerator. The diffuser can be used to introduce any fluid into a liquid or other fluid.

We claim:

1. A fluid diffuser, comprising:
   a rigid outer disc having a central fluid opening and a scalloped perimeter defined by alternating crests and valleys; and
   a flexible diaphragm including a flat, uninterrupted portion that overlaps one face of said disc and a rim portion that receives the crests of said scalloped perimeter, said rim portion overlying less than the entire scalloped perimeter so that fluid openings are provided between the rim portion and said valleys.

2. A diffuser in accordance with claim 1 wherein the opposite face of said disc has shoulder sections extending circumferentially between said crests and valleys, and corresponding sections of said rim portion abut against said shoulder sections while the rim portion between said sections can move radially inwardly into said valleys.

3. A diffuser in accordance with claim 1 wherein the opposite face of said disc has radially sloping shoulder sections extending circumferentially between said crests and valleys, and corresponding sections of said rim portion ride over said shoulder sections as said diaphragm is distorted by fluid under pressure admitted through said fluid opening.

4. An air diffuser, comprising:
   a rigid disc having top and bottom faces, a central air inlet extending through said faces, and a scalloped outer perimeter defined by alternating crests and valleys; and
   a flexible diaphragm including a flat, uninterrupted portion that overlays said top face of said disc and a rim portion that has recesses that receive and hold the crests of said perimeter while leaving the valleys free,
   whereby air under pressure can escape from between the top face of said disc and said diaphragm at said valleys.

5. An air diffuser, comprising:
   a rigid disc having top and bottom faces, a central air inlet extending through said faces, and a scalloped outer perimeter defined by alternating crests and valleys; and
   a flexible diaphragm including a flat, uninterrupted portion that overlays said top face of said disc and a rim portion extending downwardly from said flat portion and including an inwardly facing peripheral edge, said rim portion having recesses extending radially outwardly from said edge, said recesses receiving and holding the crests of said perimeter with said edge spaced from said valleys to define air openings between said edge and said valleys.

6. A diffuser in accordance with claim 5 wherein said diaphragm is formed of an elastomer that will deform under the influence of air pressure admitted through said air inlet to have the edge of said rim portion move toward said valleys.

7. An air diffuser in accordance with claim 6 wherein said bottom face has circumferential shoulder sections disposed at a diameter that is between the tops of said crests and the bottoms of said valleys, and corresponding sections of said rim portion abut against said shoulder sections while said edge of the rim portion between said sections can deform radially inwardly toward said bottom of said valleys.

8. A diffuser in accordance with claim 6 wherein the bottom face of said disc has radially sloping shoulder sections extending circumferentially at a diameter between the tops of said crests and the bottoms of said valleys, and corresponding sections of said rim portion ride over said shoulder sections as said rim portion deforms radially inwardly toward said bottoms of said valleys.

9. An air diffuser in accordance with claim 5 wherein said alternating crests and valleys are defined by curved surfaces.

10. An air diffuser in accordance with claim 5 wherein said disc has a hollow boss extending from said bottom face of said disc and opening into said central air inlet, together with a series of vanes each extending in a spiral direction along said bottom face from said boss to said shoulder.

11. An air diffuser in accordance with claim 10 together with a series of vane extensions projecting along the underside of said rim portion and each extension being a continuation of a vane.

12. An air diffuser in accordance with claim 5 wherein said rim section has its outer perimeter provided with notches between adjacent recesses.

* * * * *